(12) United States Patent
Sorensen (10) Patent No.: US 10,649,083 B2
(45) Date of Patent: May 12, 2020

(54) THREE-DIMENSIONAL (3D) AND/OR FOUR-DIMENSIONAL (4D) ULTRASOUND IMAGING (71) Applicant: B-K Medical Aps, Herlev (DK)

(72) Inventor: Ole Moller Sorensen, Tune (DK)

(73) Assignee: B-K Medical ApS, Herlev (DK)

( * ) Notice: Subject to any disclaimer, the term of this patent is extended or adjusted under 35 U.S.C. 154(b) by 315 days.

(21) Appl. No.: 15/318,206

(22) PCT Filed: Jun. 13, 2014

(86) PCT No.: PCT/IB2014/062221
§ 371 (c)(1),
(2) Date: Dec. 12, 2016

(87) PCT Pub. No.: WO2015/189663
PCT Pub. Date: Dec. 17, 2015

(65) Prior Publication Data
US 2017/0115390 A1  Apr. 27, 2017

(51) Int. Cl.
*G01S 15/89* (2006.01)
*G01S 7/52* (2006.01)

(52) U.S. Cl.
CPC ...... *G01S 15/8993* (2013.01); *G01S 7/52044* (2013.01); *G01S 15/8925* (2013.01); *G01S 15/8927* (2013.01)

(58) Field of Classification Search
CPC ........ G01S 15/89; G01S 7/52; G01S 15/8993; G01S 7/52044; G01S 15/8925; G01S 15/8927
See application file for complete search history.

(56) References Cited

U.S. PATENT DOCUMENTS

| 4,694,434 A | 9/1987 | von Ramm |
| 5,655,536 A * | 8/1997 | Takamizawa ....... G01S 15/8925 600/447 |

(Continued)

FOREIGN PATENT DOCUMENTS

| CN | 101650437 A | 2/2010 |
| WO | 2012146946 A1 | 11/2012 |

OTHER PUBLICATIONS

International Search Report for PCT/IB2014/062221 published as WO2015/189663 A1 dated Dec. 17, 2015.

*Primary Examiner* — Hovhannes Baghdasaryan
*Assistant Examiner* — Amie M Ndure
(74) *Attorney, Agent, or Firm* — Anthony M. Del Zoppo, III; Daugherty & Del Zoppo Co., LPA (57) ABSTRACT

An ultrasound imaging system (100) includes at least first and second arrays (108) of transducer elements, which are angularly offset from each other in a same plane. Transmit circuitry (112) excites the first and second arrays to concurrently transmit over a plurality of angles. Receive circuitry (114) controls the first and second arrays to concurrently receive echo signals over the plurality of angles. An echo processor (116) processes the received signals, producing a first data stream for the first array and a second data stream for the second array. The first and second data streams include digitized representations of the received echo signals. A sample matcher (118) compares samples of the first and second data streams and determines a cross-correlation there between. A correlation factor generator (120) that generates a correlation factor signal based on the determined cross-correlation. A scan converter (122) generates a 3D image for display based on the correlation factor signal and the first and second data streams.

25 Claims, 5 Drawing Sheets

(56) References Cited

U.S. PATENT DOCUMENTS

| | | | |
|---|---|---|---|
| 5,901,708 A | 5/1999 | Chang et al. | |
| 6,102,865 A * | 8/2000 | Hossack | A61B 8/145 600/443 |
| 6,352,510 B1 | 3/2002 | Barabash et al. | |
| 7,691,060 B2 | 4/2010 | Angelsen et al. | |
| 2008/0027318 A1* | 1/2008 | Umemura | G01S 7/5209 600/437 |
| 2011/0208057 A1* | 8/2011 | Oikawa | A61B 5/0095 600/443 |
| 2013/0079640 A1* | 3/2013 | Osawa | A61B 8/4477 600/447 |
| 2013/0338506 A1* | 12/2013 | Kim | G01S 7/52095 600/447 |
| 2014/0050048 A1 | 2/2014 | Jensen | |
| 2016/0195499 A1* | 7/2016 | Michel | G01N 29/262 73/628 |

* cited by examiner

THREE-DIMENSIONAL (3D) AND/OR FOUR-DIMENSIONAL (4D) ULTRASOUND IMAGING

RELATED APPLICATION

This application is a national filing of PCT application Serial No. PCT/IB2014/062221, filed Jun. 13, 2014, published as WO2015/189663 A1 on Dec. 17, 2015. This application claims priority to PCT application Serial No. PCT/IB2014/062221, published as WO2015/189663 A1 on Dec. 17, 2015.

TECHNICAL FIELD

The following generally relates to ultrasound imaging and more particularly to an ultrasound imaging apparatus configured for three-dimensional (3D) and/or four-dimensional (4D) ultrasound imaging.

BACKGROUND

An ultrasound imaging system provides useful information about the interior characteristics of an object under examination. An example ultrasound imaging system has included an ultrasound probe with a transducer array and a console. The ultrasound probe houses the transducer array, which includes one or more transducer elements. The console includes a display monitor and a user interface.

The transducer array transmits an ultrasound signal into a field of view and receives echoes produced in response to the signal interacting with structure therein. The received echoes are processed, generating images of the scanned structure. The images can be visually presented through the display monitor. Depending on the configuration of the ultrasound imaging apparatus, the images can be two-dimensional (2D), three-dimensional (3D) and/or four-dimensional (4D).

An ultrasound imaging system equipped for 3D and/or 4D imaging has been either semi-mechanical or has included a 2D matrix of elements. A semi-mechanical ultrasound imaging system has included an electromechanical drive system that converts rotational motion of a motor into translational, rotational and/or wobbling movement of the ultrasound transducer array. Unfortunately, this approach requires additional hardware, which can increase cost and the footprint.

An ultrasound imaging system with a 2D matrix of elements includes a larger number of elements, interconnects to each of the elements and corresponding channels for the elements in the console, relative to a configuration with a 1D, 1.5D or 1.75D array of transducer elements. Unfortunately, a 2D matrix of elements increases cost, routing complexity, and processing requirements, relative to a configuration without a 1D, 1.5D or 1.75D array of transducer elements.

SUMMARY

Aspects of the application address the above matters, and others.

In one aspect, an ultrasound imaging system includes at least two 1D arrays of transducer elements. The at least two 1D arrays includes a first array of transducer elements and a second array of transducer elements. The first and second arrays of transducer elements are angularly offset from each other in a same plane. The ultrasound imaging system further includes transmit circuitry that excites the first and second arrays of transducer elements to concurrently transmit over a plurality of angles. The ultrasound imaging system further includes receive circuitry that controls the first and second arrays of transducer elements to concurrently receive echo signals over the plurality of angles. The ultrasound imaging system further includes an echo processor that processes the received signals, producing a first data stream for the first array and a second data stream for the second array. The first and second data streams include digitized representations of the received echo signals. The ultrasound imaging system further includes a sample matcher that compares samples of the first and second data streams and determines a cross-correlation there between. The ultrasound imaging system further includes a correlation factor generator that generates a correlation factor signal based on the determined cross-correlation. The ultrasound imaging system further includes a scan converter that generates a 3D image for display based on the correlation factor signal and the first and second data streams.

In another aspect, a method includes comparing echo signals concurrently received by at least two 1D arrays of a transducer probe. The at least two arrays are disposed in a same plane, transverse to each other. The method further includes determining a correlation factor signal based on the comparison. The method further includes generating a 3D image based on the echo signals and the correlation factor signal.

In another aspect, a computing apparatus includes a computer processor that generates cross-correlation values between samples of at least two ultrasound signals, wherein the at least two ultrasound signals are acquired with at least two transducer arrays spatially oriented transverse to each other in a same plane, and generates a 3D ultrasound imaged based on the cross-correlation values and the samples.

Those skilled in the art will recognize still other aspects of the present application upon reading and understanding the attached description.

BRIEF DESCRIPTION OF THE DRAWINGS

The application is illustrated by way of example and not limitation in the figures of the accompanying drawings, in which like references indicate similar elements and in which.

DETAILED DESCRIPTION

Figure 1:
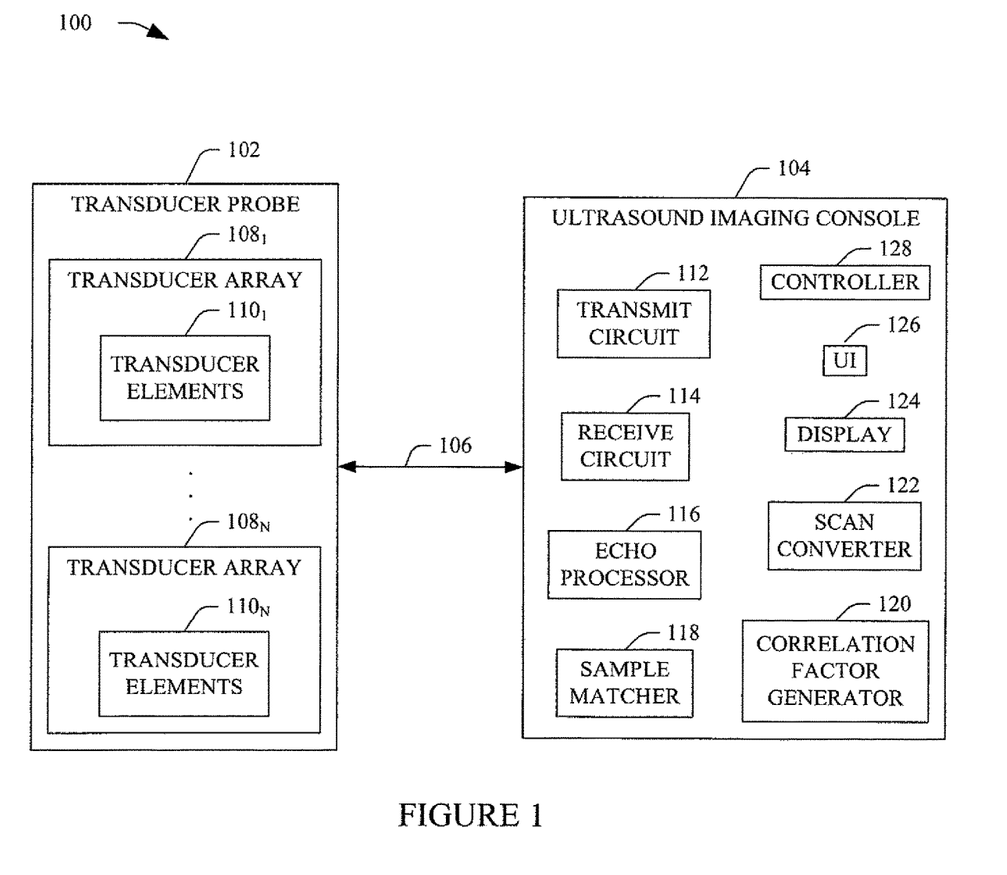
FIG. 1 schematically illustrates an ultrasound imaging system that includes a probe with multiple 1D arrays of transducer elements and a console.

FIG. 1 schematically illustrates a system 100 that includes an ultrasound imaging probe 102 and an ultrasound imaging console 104. In this example, the probe 102 and the console 104 communicate through a communication path 106.

The ultrasound imaging probe 102 includes N one-dimensional (1D) transducer arrays, including a transducer array $108_1$, ..., a transducer array $108_N$, where N is an integer equal to or greater than two, collectively referred to herein as transducer arrays 108. The transducer arrays $108_1$, ..., $108_N$ respectively include sets $110_1$, ..., $110_N$ of transducer elements. The transducer arrays 108 can be linear, curved, and/or otherwise shaped arrays. A transducer array 108 can include sixty-four (64), ninety-six (96), two hundred and fifty-six (256), and/or other number of transducer elements.

In one instance, the probe 102 includes two transducer arrays (i.e., N=2), which are transverse to each other, or orthogonal, in a same plane, and acquire data for 3D and/or 4D imaging, using a limited number of transducer elements and a corresponding number of signal channels, without mechanically moving any of the 1D transducer arrays 108 and without including a 2D matrix transducer and the associated high number of interconnects and channels. This can reduce complexity and cost, relative to a configuration that mechanically move a transducer array and/or includes a 2D matrix.

The console 104 includes transmit circuitry 112 that controls excitation of the transducer elements 110 of the transducer arrays 108 to transmit ultrasound signals. In one instance, this includes controlling at least two of the transducer arrays 108 to concurrently transmit beams from the elements 110 of at least two of the arrays 108. The console 104 further includes receive circuitry 114 that routes RF analog (echo) signals received by the transducer elements 110. A switch can be used to switch between the transmit circuitry 112 and the receive circuitry 114.

Angling of the beams can be through phased array and/or other approaches, during which a time-correlating and/or other approach can be used for focus and/or for direction of focus for transmission and/or reception. Transmission and reception can be repeated until a spatial angle of interest is covered. For example, where each transducer array 108 is focused over forty-five (45) different angles with one (1) degree resolution, angling is repeated 45×45, or 2025 times. Other angular and/or resolution is also contemplated herein.

The console 104 further includes an echo processor 116 that converts the received RF analog signals for each of the arrays 108 into digital representations in respective data streams. For two arrays 108, each including 96 elements, this includes processing (e.g., delay and summing) the 96 signals from each of the 96 elements of each of the arrays 108 and producing two data streams, one for each of the transducer arrays 108. Envelope detection, using a Hilbert transform, etc., can be used to detect the amplitude, which is included in the data streams. The number of samples in a data stream depends on the length of the receive period and on the sample frequency.

The console 104 further includes a sample matcher 118 that compares the samples in different data streams. The comparison can be performed sample-wise, using a predetermined number of earlier and later samples, multiplied with a predetermined weighting function. For the comparison, the sample matcher 118 can apply a cross-correlation approach where a cross-correlation of one (1) indicates an exact match, a cross-correlation of zero (0) indicates no match, and a cross-correlation there between indicates a relative degree of match there between.

The console 104 further includes a correlation factor signal generator 120. The correlation factor signal generator 120, in one instance, generates a correlation factor signal for two of the arrays 108. The correlation factor signal includes a sequence of correlation factors describing how equal the samples in the signals are as a function of time during reception. The correlation factor signal is based on the cross-correlation values determined by the sample matcher 118.

Briefly turning to FIGS. 2, 3, 4, 5, 6, 7, 8, 9 and 10, example envelope signals and corresponding correlation factor signals are illustrated. In FIGS. 2, 3, 4, 5, 6, 7, 8, 9 and 10, the envelope signals start at the point in time just following transmission. A first or y-axis 202 represents amplitude and a second or x-axis 204 represents time.

Figure 2:
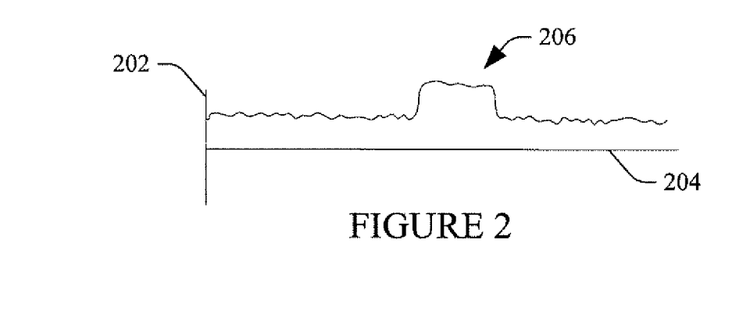
FIG. 2 illustrates the envelope signal for a first array with an object in the beam profile.
Figure 3:
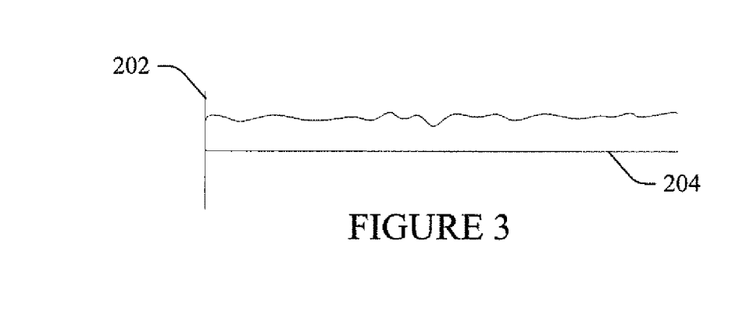
FIG. 3 illustrates the envelope signal for a second different array with the object not in the beam profile.
Figure 4:
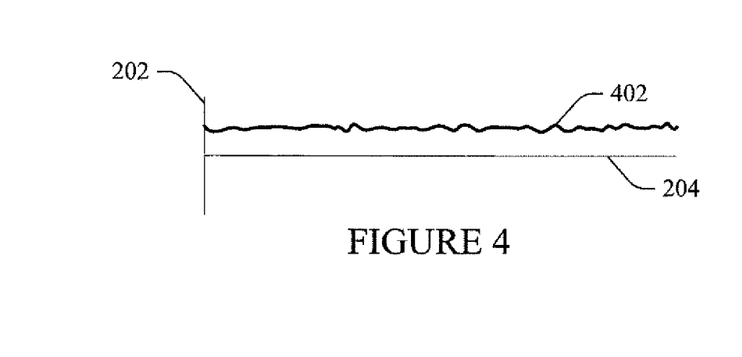
FIG. 4 shows the correlation factor signal for the envelope signals of FIGS. 2 and 3.

FIGS. 2-4 show an example in which an object it located in the beam profile of one of the arrays 108. FIG. 2 shows the envelope signal for the array 108 with the object in the beam profile. A region 206 corresponds to echo signals from the object. FIG. 3 shows the envelope signals for the array 108 with no object in the beam profile. The echo signals include low level, such as inherent noise of the system and low level background scatter. FIG. 4 shows the correlation factor signal 402, using a cross-correlation approach with the envelope signals of FIGS. 2 and 3. The envelope signals are not correlated, and the resulting correlation factor signal 402 is low.

Figure 5:
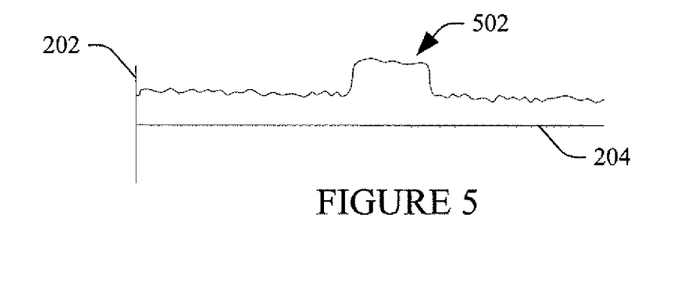
FIG. 5 illustrates the envelope signal for a first array with an object in the beam profile.
Figure 6:
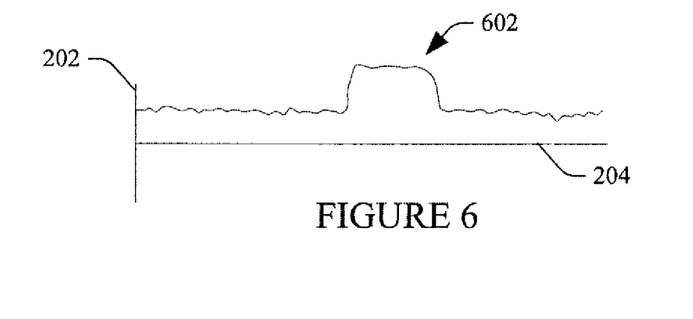
FIG. 6 illustrates the envelope signal for a second different array with the object in the beam profile.
Figure 7:
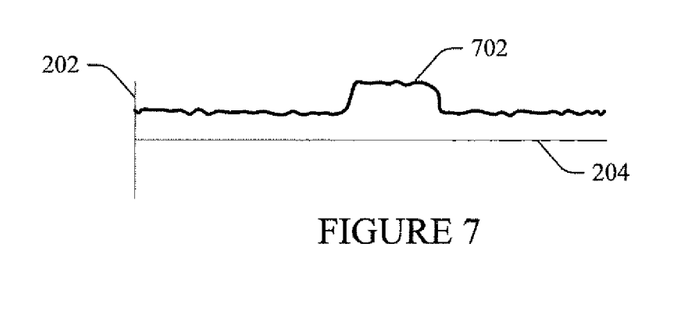
FIG. 7 shows the correlation factor signal for the envelope signals of FIGS. 5 and 6.

FIGS. 5-7 show an example in which an object it located in both beam profile. FIG. 5 shows the envelope signals for one of the arrays 108 with the object in the beam profile, and FIG. 6 shows the envelope signals for the other one of the arrays 108 with the object in the beam profile. Regions 502 and 602 correspond to echo signals from the object. FIG. 7 shows the correlation factor signal 702, using a cross-correlation approach with the envelope signals of FIGS. 5 and 6. The envelope signals of FIGS. 5 and 6 are correlated, and the resulting correlation factor signal 702 is high.

With FIGS. 2-7, the object is solid, having a constant factor of reflection all over its cross-section.

Figure 8:
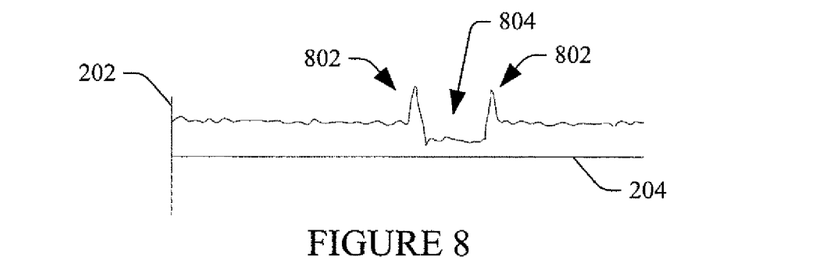
FIG. 8 illustrates the envelope signal for first array with an object in the beam profile.
Figure 9:
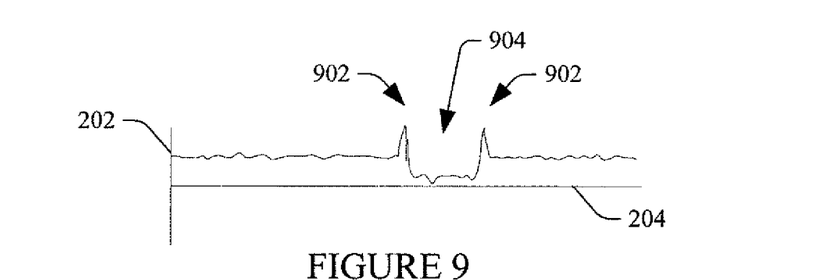
FIG. 9 illustrates the envelope signal for a second different array with the object in the beam profile.
Figure 10:
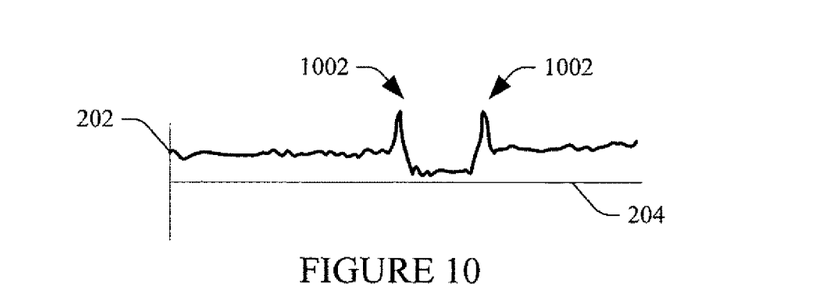
FIG. 10 shows the correlation factor signal for the envelope signals of FIGS. 8 and 9.

In FIG. 8-10, the object (e.g., such as a blood vessel or a gall bladder) contains a fluid. In this situation, the echoes are strong from the edges of the object and very low from the inside fluid. This is caused by the fact the low level echo from the inside of the object (the envelope) might be lower than the background noise.

FIG. 8 shows the envelope signals for one of the arrays 108 with the object in the beam profile, and FIG. 9 shows the envelope signals for the other one of the arrays 108 with the object in the beam profile. Regions 802 and 902 correspond to echo signals from the edges of the object. Regions 804 and 904 correspond to echo signals from the inside of the object.

FIG. 10 shows the correlation factor signal 1002, using a cross-correlation approach with the envelope signals of FIGS. 8 and 9. The envelope signals of FIGS. 8 and 9 corresponding to the edges are correlated, and the resulting correlation factor signal 1002 is high. The envelope signals of FIGS. 8 and 9 corresponding to the inside are correlated, and lower than the background noise.

Returning to FIG. 1, the console 104 further includes a scan converter 122, which coverts processed signals and generates an image for display, and a display 124, which can be used to display the scan converted data. To establish a gray-scale for visual presentation, in one instance, the correlation factor signal can be used as multipliers for an average value between two envelope signals. This, with or without the use of a low level threshold, can suppress background scatter-echoes, etc.

The console 104 further includes a user interface (UI) 126 with an input device(s) (e.g., a mouse, keyboard, touch controls, etc.), which allows for user interaction with the system 100. The console 104 further includes a controller 128 that controls at least one of the transmit circuitry 112, the receive circuitry 114, the echo processor 116, the sample matcher 118 or the scan converter 122.

Variations are discussed.

In one variation, where the object is solid (as discussed in connection with FIGS. 2-7), a lowest sample value approach is employed. For this approach, the sample matcher 118 identifies and selects the lowest sample value of a set of compared samples of the envelope signals. Doing this, the values used for the resulting signal, always relate to the most selective array in the angle of direction from which the signal originates. If the two values are equal, it does not matter which one is selected.

In another variation, a synthetic aperture approach is employed. With one synthetic aperture approach, a phased array is not employed, and all element signals from both of the arrays 108 are processed simultaneously in one process calculating a 3D beam profile in a defined spatial angle.

In another variation, at least one of the transducer arrays 108 includes a 1.5D or 1.75D array of transducer elements.

In another variation, at least one of the sample matcher 118, the correlation factor generator 120 or the scan converter 122 is implemented by a computing system that is remote from the system 100. An example of such a computing system includes at least one processor (e.g., a microprocessor, a central processing unit, etc.) that executes at least one computer readable instruction stored in computer readable storage medium ("memory"), which excludes transitory medium and includes physical memory and/or other non-transitory medium. The microprocessor may also execute one or more computer readable instructions carried by a carrier wave, a signal or other transitory medium.

FIGS. 11, 12, 13, 14 and 15 illustrate non-limiting examples of the spatial relationship of the transducer arrays 108.

Figure 11:
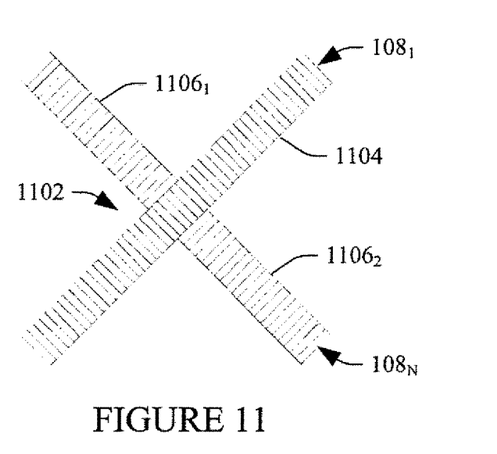
FIG. 11 illustrates an embodiment where one of the transducer arrays includes a series of contiguous elements, and the other of the transducer arrays includes two segments, each of which butts up to the one of the transducer arrays.

Initially refereeing to FIG. 11, two transducer arrays 108 (the transducer arrays $108_1$ and $108_N$) are spatially oriented with respect to each other such that they are in a same plane and cross at central region 1102, and are angularly offset from each other by ninety (90) degrees or approximately 90 degrees. In this example, the transducer array $108_1$ is a single array of contiguous transducer elements 1104, and the transducer array $108_N$ includes two segments $1106_1$ and $1106_2$, each of which butts up to the transducer array $108_1$.

Figure 12:
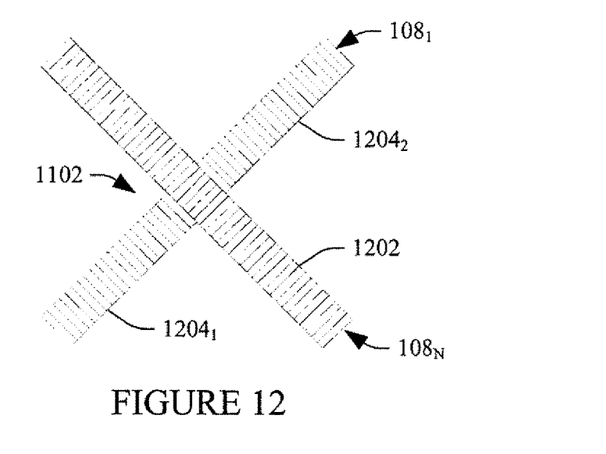
FIG. 12 illustrates an embodiment where the other of the transducer arrays includes a series of contiguous elements, and the one of the transducer arrays includes two segments, each of which butts up to the other of the transducer arrays.

Next at FIG. 12, a configuration similar to that of FIG. 11 is illustrated. This example is similar to that of FIG. 11 except that the transducer array $108_N$ includes the single array of contiguous transducer elements 1202, and the transducer array $108_1$ includes two segments $1204_1$ and $1204_2$, each of which butts up to the transducer array $108_N$.

Figure 13:
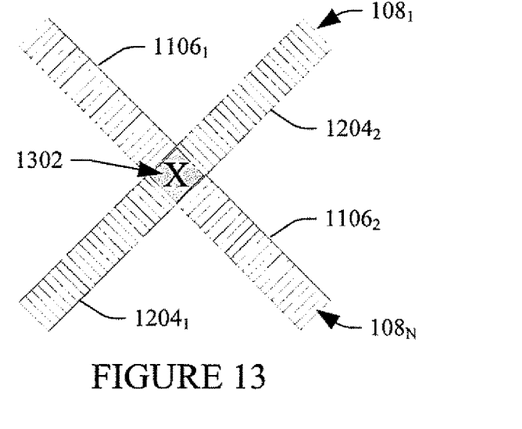
FIG. 13 illustrates an embodiment where both of the transducer arrays include two segments, each of which butts up to a region that does not include any transducer elements.

Turning to FIG. 13, an embodiment in which the transducer array $108_1$ includes the two segments $1202_1$ and $1202_2$ and the transducer array $108_N$ includes the two segments $1106_1$ and $1106_2$, and the four segments $1106_1$, $1106_2$, $1202_1$ and $1202_2$ butt-up to a region 1302 that does not include any transducer elements, is illustrated.

Figure 14:
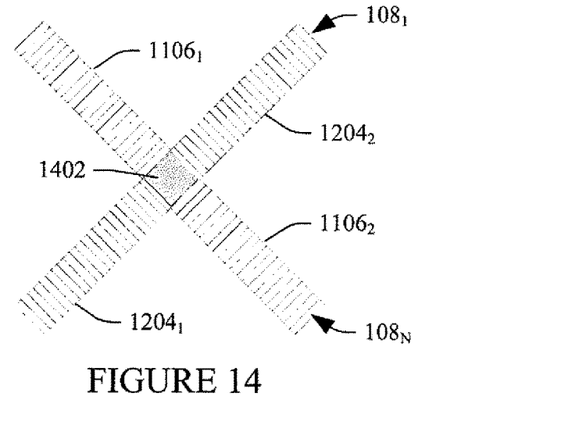
FIG. 14 illustrates an embodiment where both of the transducer arrays include two segments, each of which butts up to a transducer element that is shared by the transducer arrays.

FIG. 14 illustrates an embodiment in which the transducer array $108_1$ includes the two segments $1202_1$ and $1202_2$ and the transducer array $108_N$ includes the two segments $1106_1$ and $1106_2$, and the four segments $1106_1$, $1106_2$, $1202_1$ and $1202_2$ butt-up to a transducer element 1402 that is shared by the transducer arrays $108_1$ and $108_N$.

Figure 15:
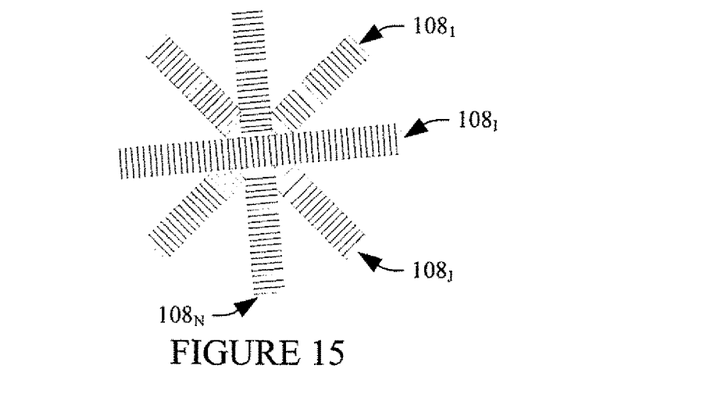
FIG. 15 illustrates an embodiment with at least four transducer arrays.

FIG. 15 illustrates an embodiment with at least four transducer arrays 108 (the transducer arrays $108_1$ and $108_N$ and transducer arrays $108_1$ and $108_J$). In this embodiment, the transducer arrays 108 are spatially oriented with respect to each other such that they are in a same plane and cross at central region 1102, and are angularly offset from each other by forty-five (45) degrees or approximately 45 degrees. A middle region can include a transducer element for one of the arrays 108, a transducer element shared by two or more of the arrays 108, or no transducer element.

Other configurations are also contemplated herein.

Figure 16:
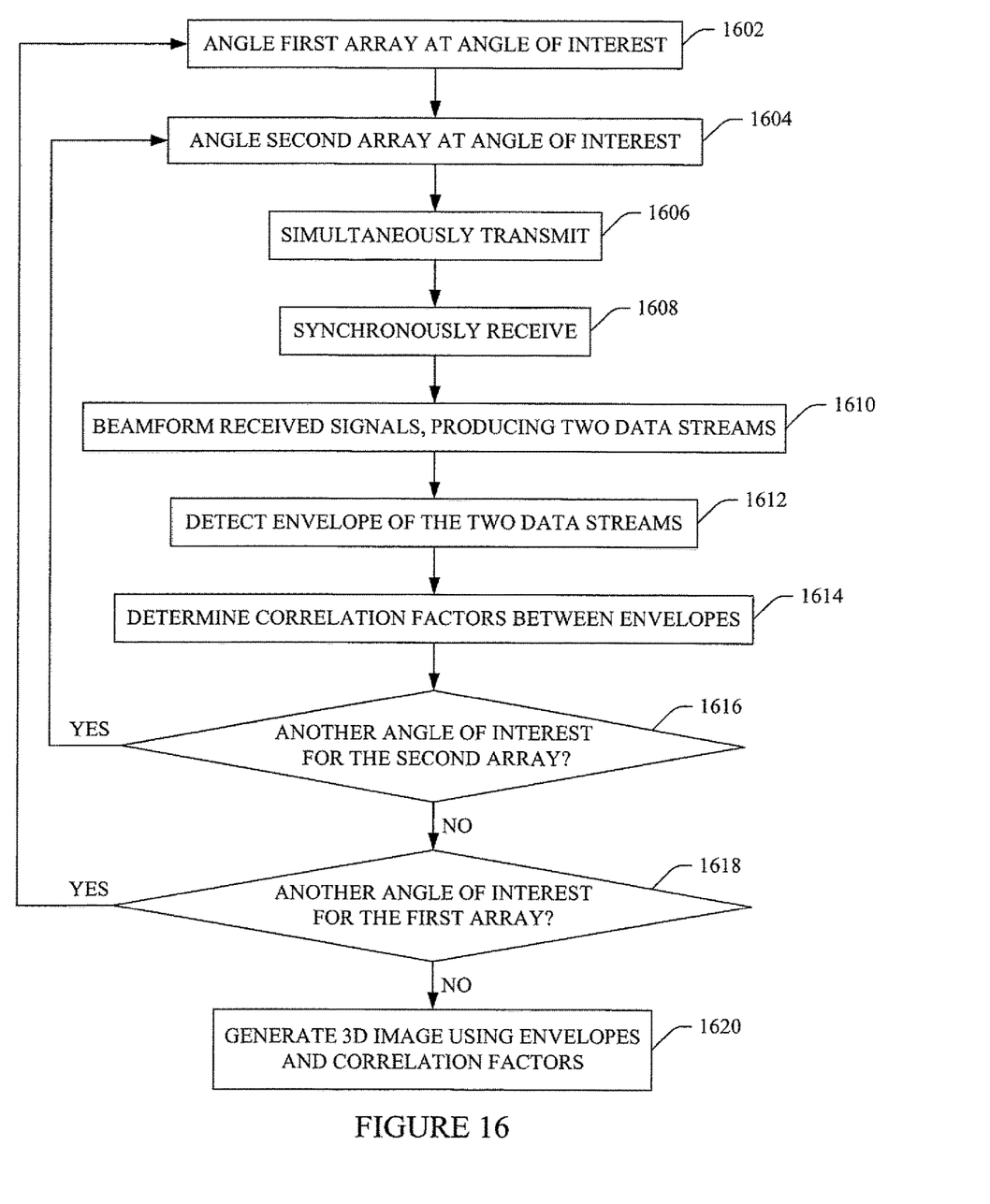
FIG. 16 illustrates an example method for 3D ultrasound imaging using at least two transducer arrays configured as shown in one of FIGS. 11, 12, 13, 14 and 15.

FIG. 16 illustrates an example method for 3D ultrasound imaging using two of the transducer arrays 108 configured as shown in one of FIGS. 11, 12, 13, 14 and 15.

It is to be understood that the following acts are provided for explanatory purposes and are not limiting. As such, one or more of the acts may be omitted, one or more acts may be added, one or more acts may occur in a different order (including simultaneously with another act), etc.

At 1602, one of the arrays 108 is angled at an angle of interest. For example, the array 108 maybe angled at −45 degrees for a set of angles in an angular range from −45 to +45 degrees. In another instance, a different initial angle and/or a different set of angles is employed.

At 1604, the other of the arrays 108 is angled at an angle of interest. Likewise, the array 108 maybe angled at −45 degrees for a set of angles in an angular range from −45 to +45 degrees. In another instance, a different initial angle and/or a different set of angles is employed.

At 1606, the two arrays 108 are simultaneously excited to transmit.

At 1608, the two arrays 108 synchronously receive.

At 1610, the received analog RF signals for each of the two arrays 108 are beamformed, producing two data stream signals with digital representations of the received analog RF signals.

At 1612, the envelope of each of the data stream signals is detected.

At 1614, correlation factors are determined between the envelopes of the data stream signals and saved.

At 1616, it is determined if the other of the arrays is to be angled at another angle of interest. If so, acts 1604 through 1614 are repeated for another angle of interest. For example, the array 108 maybe incremented to −44 degrees or other angle in the angular range.

If not, at 1618, it is determined if the one of the arrays is to be angled at another angle of interest. If so, acts 1602 through 1616 are repeated for another angle of interest. For example, the array 108 maybe incremented to −44 degrees or other angle in the angular range.

If not, at 1620, a 3D image is generated based on the correlation factors and the envelope signals. The 3D image can be visually presented, conveyed to another device, further processed, etc.

The above may be implemented by way of computer readable instructions, encoded or embedded on computer readable storage medium, which, when executed by a computer processor(s), cause the processor(s) to carry out the described acts. Additionally or alternatively, at least one of the computer readable instructions is carried by a signal, carrier wave or other transitory medium.

In a variation, echo signals from multiple angles can be processed simultaneously, which can reduce the number of iterations in the inner loop (act 1616) of FIG. 16. Reducing the number of iterations can increase the frame rate of the system, and thereby the number of 3D images produced each second. 4D mode can be implemented if this number is high enough to generate useful 3D images as function of time.

The application has been described with reference to various embodiments. Modifications and alterations will occur to others upon reading the application. It is intended that the invention be construed as including all such modifications and alterations, including insofar as they come within the scope of the appended claims and the equivalents thereof.

What is claimed is:

1. An ultrasound imaging system, comprising:
   at least two 1D arrays of transducer elements, including a first array of transducer elements and a second array of transducer elements angularly offset from each other in a same plane, wherein the at least two 1D arrays of transducer elements are not included in a 2D matrix transducer;
   transmit circuitry that excites the first and second arrays of transducer elements to concurrently transmit beams at each of a plurality of different angles;
   receive circuitry that controls the first and second arrays of transducer elements to concurrently receive echo signals at each of the plurality of different angles;
   an echo processor that beamforms the received signals from the first and second arrays to produce a first data stream for the first array and a second data stream for the second array, wherein the first and second data streams include digitized representations of the received echo signals and a number of samples in a data stream depends on a length of a receive period and on a sample frequency, and the echo processor further detects, by way of envelope detection, amplitudes of the samples in the first and second data streams;
   a sample matcher that compares the detected amplitudes of the samples of the first and second data streams and determines a cross-correlation value between each pair of compared detected sample amplitudes;
   a correlation factor generator that generates a correlation factor signal based on the determined cross-correlation values, wherein the correlation factor signal includes a sequence of the cross-correlation values describing how equal the samples in the signals are as a function of time during reception; and
   a scan converter that generates a 3D image based on the first and second data streams and determines a gray-scale for the 3D image by multiplying the cross-correlation values of the correlation factor signal by averages of the amplitudes of samples of the first and second data streams.

2. The system of claim 1, wherein the first and second arrays of transducer elements are orthogonal to each other.

3. The system of claim 1, wherein one of the first array or the second array includes a contiguous array of transducer elements and the other of the first or second arrays includes two segments, each of which butts up to the contiguous array at a central region of the contiguous array.

4. The system of claim 1, wherein the first and second arrays each include two segments, each of which butts up to a non-transducing region.

5. The system of claim 1, wherein the first and second arrays each include two segments, each of which butts up to a transducing region.

6. The system of claim 5, wherein the transducing region is shared by the first and second arrays.

7. The system of claim 1, wherein the at least two arrays include at least a third array and a fourth array of transducer elements.

8. The system of claim 7, wherein the first, the second, the third, and the fourth arrays of transducer elements are angularly offset from each other by forty-five degrees.

9. The system of claim 7, wherein the first, the second, the third, and the fourth arrays of transducer elements butt-up to a same region that does not include any transducer elements.

10. The system of claim 7, wherein the first, the second, the third, and the fourth arrays of transducer elements butt-up to a same transducer element that is shared by the first, the second, the third, and the fourth arrays of transducer elements.

11. The system of claim 1, wherein a cross-correlation of one indicates the samples match.

12. The system of claim 11, wherein a cross-correlation of zero indicates the samples do not match.

13. The system of claim 12, wherein a cross-correlation between zero and one indicates a relative degree of correlation between the samples.

14. The system of claim 1, where the scan converter applies a predetermined threshold value to suppress background scatter-echoes.

15. The system of claim 1, further comprising:
   a controller that controls an angle of the beams of the at least two 1D arrays.

16. The system of claim 15, wherein the angle is controlled to focus the beams over a predetermined number of different angles based on a predetermined angular increment for transmit and receive.

17. The system of claim 16, wherein a transmit operation and a receive operation is performed by each of the at least two 1D arrays at each of the angles.

18. The system of claim 17, wherein streams of data from different angles are processed serially.

19. The system of claim 17, wherein streams of data from different angles are processed simultaneously.

20. The system of claim 16, wherein the angle of one of the beams is incremented over the predetermined number of different angles while the angle of the other of the beams is held constant.

21. The system of claim 20, wherein the angle of the other of the beams is incremented one increment after each time the one of the beams is incremented over the predetermined number of different angles.

22. The system of claim 20, wherein the angle is forty-five degrees and the increment is one degree.

23. The system of claim 15, wherein the controller changes the angle of one of the beams and activates the at least two 1D arrays to transmit and receive.

24. The system of claim 15, wherein the controller sequentially changes the angle of one of the beams for an entire set of angles and activates the at least two 1D arrays to transmit and receive at each angle of the entire set of angles.

25. The system of claim 1, wherein the receive echo signals include acquired data for at least one of 3D and 4D imaging.

* * * * *